United States Patent
Sharma et al.

(10) Patent No.: US 10,172,184 B2
(45) Date of Patent: Jan. 1, 2019

(54) DETERMINATION OF HOME ROUTING CAPABILITY OF A NEUTRAL HOST NETWORK

(71) Applicant: QUALCOMM Incorporated, San Diego, CA (US)

(72) Inventors: Manu Sharma, Sunnyvale, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/633,346

(22) Filed: Jun. 26, 2017

(65) Prior Publication Data
US 2017/0374706 A1 Dec. 28, 2017

Related U.S. Application Data

(60) Provisional application No. 62/355,159, filed on Jun. 27, 2016.

(51) Int. Cl.
| | |
|---|---|
| H04W 4/00 | (2018.01) |
| H04W 88/06 | (2009.01) |
| H04W 8/00 | (2009.01) |
| H04W 76/20 | (2018.01) |
| H04W 76/12 | (2018.01) |
| H04W 8/08 | (2009.01) |
| H04W 8/18 | (2009.01) |

(52) U.S. Cl.
CPC .......... *H04W 88/06* (2013.01); *H04W 8/00* (2013.01); *H04W 76/12* (2018.02); *H04W 76/20* (2018.02); *H04W 8/087* (2013.01); *H04W 8/183* (2013.01)

(58) Field of Classification Search
CPC ..... H04W 4/22; H04W 12/06; H04W 76/007; H04W 36/16; H04W 36/14
USPC ............. 455/432.1; 370/338, 328; 709/227
See application file for complete search history.

(56) References Cited

U.S. PATENT DOCUMENTS

| | | |
|---|---|---|
| 2013/0223421 A1 | 8/2013 | Gundavelli et al. |
| 2015/0359026 A1 | 12/2015 | Iwai et al. |
| 2017/0295483 A1* | 10/2017 | Wang ............ H04W 4/22 |

FOREIGN PATENT DOCUMENTS

| | | |
|---|---|---|
| WO | 2010128165 A2 | 11/2010 |
| WO | 2016034199 A1 | 3/2016 |

OTHER PUBLICATIONS

International Search Report and Written Opinion—PCT/US2017/039408—ISA/EPO—dated Sep. 1, 2017 (164074WO).

* cited by examiner

*Primary Examiner* — Phuoc H Doan
(74) *Attorney, Agent, or Firm* — Arent Fox, LLP

(57) ABSTRACT

A neutral home network (NHN) may support home-routed traffic between a user equipment (UE) and a network of a mobile network operator (MNO) associated with the UE. The NHN may transmit an access point name (APN) that indicates a public land mobile network (PLMN) identifier (ID) to the UE. If the NHN supports home-routed traffic, the NHN may transmit an APN that indicates an MNO PLMN ID. If the NHN does not support home-routed traffic, the NHN may transmit an APN that indicates an NHN PLMN ID. From the APN, the UE may determine whether the NHN supports home-routed traffic. If the NHN supports home-routed traffic, the UE may transmit a packet data network (PDN) connectivity request to the NHN. If the NHN does not support home-routed traffic, the UE may establish a tunnel to the MNO network through Internet access provided by the NHN.

31 Claims, 10 Drawing Sheets

DETERMINATION OF HOME ROUTING CAPABILITY OF A NEUTRAL HOST NETWORK

CROSS-REFERENCE TO RELATED APPLICATION(S)

This application claims the benefit of U.S. Provisional Application Ser. No. 62/355,159, entitled "DETERMINATION OF HOME ROUTING CAPABILITY OF A NEUTRAL HOST NETWORK" and filed on Jun. 27, 2016, which is expressly incorporated by reference herein in its entirety.

BACKGROUND

Field

The present disclosure relates generally to communication systems, and more particularly, to a neutral host network that may provide home-routed traffic to a user equipment.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In wireless communications system, a neutral host network (NHN) may provide a wireless network with connectivity (e.g., Internet connectivity) servicing user equipment (UE). The NHN may provide scalable network deployments to service UEs from a plurality service provides of a plurality of mobile networks. Such network deployments of an NHN may be self-contained. An NHN may operate according to one or more wireless standards, such as LTE, LTE-Unlicensed (LTE-U), LTE-Advanced (LTE-A), License Assisted Access (LAA), fifth generation (5G) new radio (NR), Wi-Fi, and/or other radio access technologies.

The MulteFire Alliance may specify an NHN architecture based on 3GPP Evolved Packet System (EPS) architecture. This architecture may allow self-contained deployment of NHNs independently by venues and enterprises with relatively minimal interworking with mobile network operators (MNOs).

In various aspects, an NHN deployment may support home-routed traffic and/or local breakout. For home-routed traffic, an NHN may route traffic associated with a UE through a home network of the UE—e.g., the NHN may route traffic through a gateway (e.g., serving gateway) associated with the MNO that services the UE. For example, an NHN may route a request to a packet data network (PDN) from a UE to a packet gateway (PGW) (also known as a PDN gateway) of a home public land mobile network (PLMN) of the UE (e.g., a PLMN provided by an MNO of the UE). For local breakout, the NHN may refrain from routing traffic through a home network of the UE. Instead, the NHN may provide network access and connectivity (e.g., Internet connectivity) to the UE. For example, the NHN may route a request to a PDN to a gateway associated with the NHN.

When the UE requests specialized services, such as Internet protocol (IP) multimedia subsystem (IMS) voice and voice-over-LTE (VoLTE), the UE may initiate PDN connectivity. The UE may initiate PDN connectivity through the an NHN. However, when an NHN only provides local breakout (e.g., Internet connectivity), the UE may access operator services (e.g., voice) by tunneling with the MNO associated with the UE.

In an aspect of the disclosure, a method, a computer-readable medium, and an apparatus are provided. The apparatus may be configured to receive, from a UE, an attach request. The apparatus may be further configured to determine an access point name (APN) for the UE based on whether home-routed traffic is supported between a network of an MNO and the UE and based on the received attach request. The apparatus may be further configured to transmit the determined APN to the UE. In an aspect, an APN is unspecified in the attach request. In an aspect, the APN indicates an MNO PLMN identifier (ID) or an NHN PLMN ID. In an aspect, apparatus may be configured to determine the APN based on whether home-routed traffic is supported between the network of the MNO and the UE and based on the received attach request by identifying the MNO associated with the UE based on the attach request, determining whether home-routed traffic is supported based on the identified MNO, and determining the APN based on the determination of whether home-routed traffic is supported. In an aspect, the attach request includes an international mobile subscriber identity (IMSI) associated with the UE, and the identification of the MNO associated with the UE is based on the IMSI. In an aspect, the apparatus may be further configured to route traffic from the UE to a PGW associated with the network of the MNO using an S2a interface based on whether home-routed traffic is supported. In an aspect, the apparatus may be configured to provide, to the UE, Internet access based on whether home-routed traffic is not supported.

In another aspect of the disclosure, another method, another computer-readable medium, and another apparatus are provided. The other apparatus may be a UE. The other apparatus may be configured to transmit, to a NHN, an attach request. The other apparatus may be further configured to receive, from the NHN, an APN based on the attach request. The other apparatus may be further configured to determine, based on the APN, whether the NHN supports home-routed traffic through a network of a MNO associated with the UE. The other apparatus may be further configured to connect to the network of the MNO based on the determination of whether the NHN supports the home-routed traffic. In an aspect, an APN is unspecified in the attach request. In an aspect, the attach request includes an IMSI associated with the UE. In an aspect, the APN indicates an MNO PLMN ID or an NHN PLMN ID. In an aspect, the other apparatus may determine whether the NHN supports the home-routed traffic by determining that the NHN supports the home-routed traffic when the APN indicates the MNO PLMN ID, and determining that the NHN does not support the home-routed traffic when the APN indicates the NHN PLMN ID. In an aspect, the other apparatus may be configured to connect to the network of the MNO based on the determination of whether the NHN supports the home-routed traffic by transmitting, to the NHN, a PDN connectivity request when the NHN supports the home-routed traffic. In an aspect, the other apparatus may be configured to connect to the network of the MNO based on the determination of whether the NHN supports the home-routed traffic by establishing an Internet protocol security (IPsec) tunnel to an evolved packet data gateway (ePDG) associated with the network of the MNO when the NHN does not support home-routed traffic. In an aspect, the other apparatus may be further configured to communicate with the ePDG using an SWu interface. In an aspect, the other apparatus may be further configured to access an Internet Protocol (IP) Multimedia Subsystem (IMS) service after the connection to the network of the MNO.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
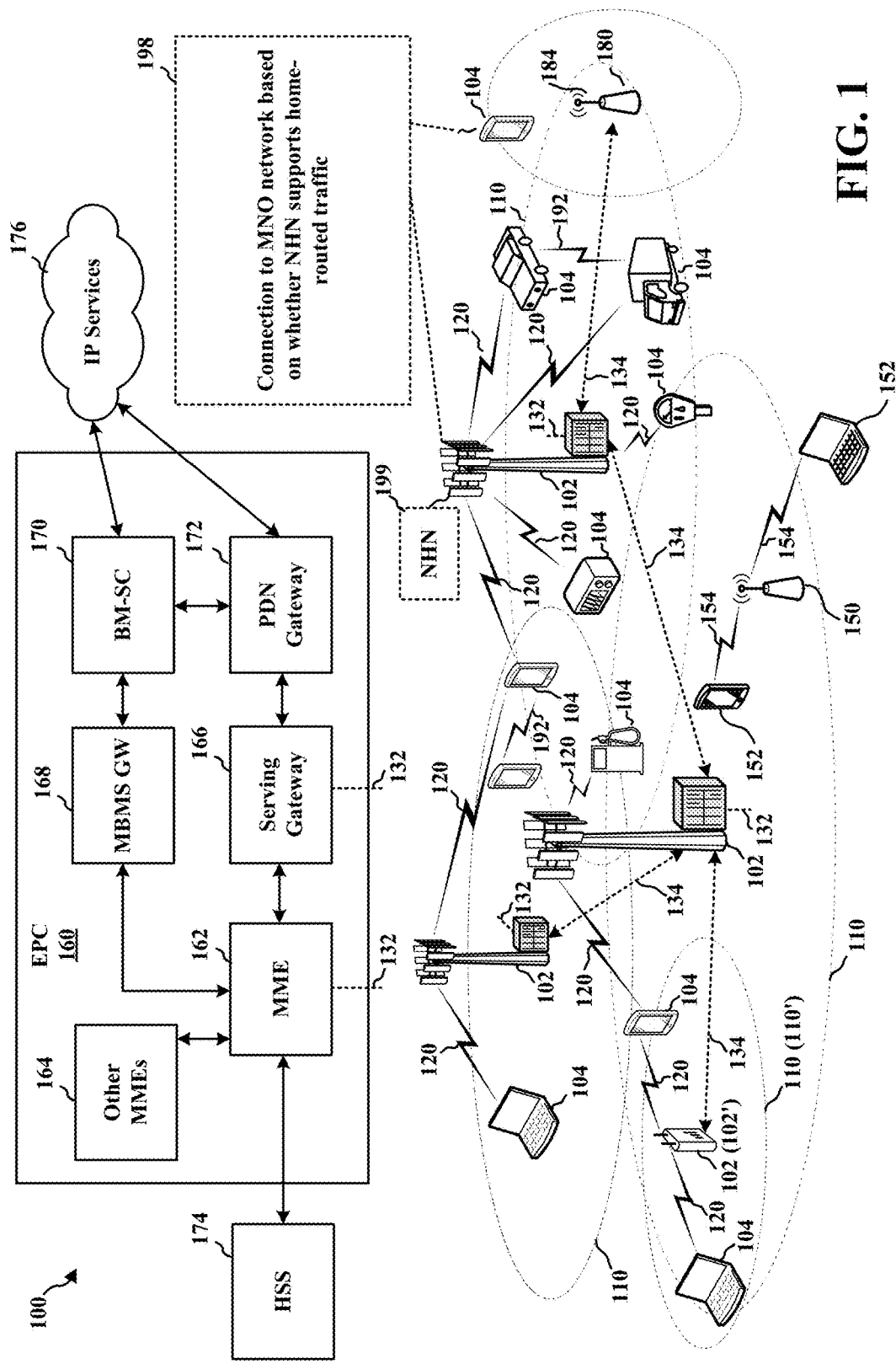
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE- PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway (SGW) 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the SGW 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102 may be a component of a neutral host network (NHN) 199. The UE 104 may be configured to establish a connection 198 to a network of a mobile network operator (MNO) based on whether the NHN 199 supports home-routed traffic for the MNO. In aspects, the UE 104 may transmit, to an NHN 199 through the eNB 102, an attach request. The UE 104 may receive, from the NHN 199 through the eNB 102, an access point name (APN) based on the attach request. The UE 104 may then determine, based on the APN, whether the NHN 199 supports home-routed traffic through a network of the MNO. The UE 104 may then establish the connection 198 to the network of the MNO based on the determination of whether the NHN 199 supports home-routed traffic. In one aspect, the UE 104 may transmit a PDN connectivity request when the UE 104 determines that the NHN 199 supports home-routed traffic. However, when the NHN 199 does not support home-routed traffic, the UE 104 may establish an IP security (IPsec) tunnel to an evolved packet data gateway (ePDG) associated with the network of the MNO.

Correspondingly, the NHN 199 may be configured to receive, from the UE 104, an attach request. The NHN 199 may be configured to determine the APN for the UE 104 based on whether home-routed traffic is supported between the network of the MNO and the UE 104 and based on the received attach request. The NHN 199 may be further configured to transmit the determined APN to the UE 104. In an aspect, the NHN 199 may be configured to determine the APN based on whether home-routed traffic is supported between the network of the MNO and the UE 104 and based on the received attach request by identifying the MNO associated with the UE 104 based on the attach request, determining whether home-routed traffic is supported based on the identified MNO, and determining the APN based on the determination of whether home-routed traffic is supported. In an aspect, the identification of the MNO associated with the UE 104 is based on the IMSI of the UE 104. In an aspect, the NHN 199 may be further configured to route traffic from the UE 104 to a PGW associated with the network of the MNO using an S2a interface based on whether home-routed traffic is supported. In an aspect, the NHN 199 may be configured to provide, to the UE 104, Internet access based on whether home-routed traffic is not supported.

Figure 2:
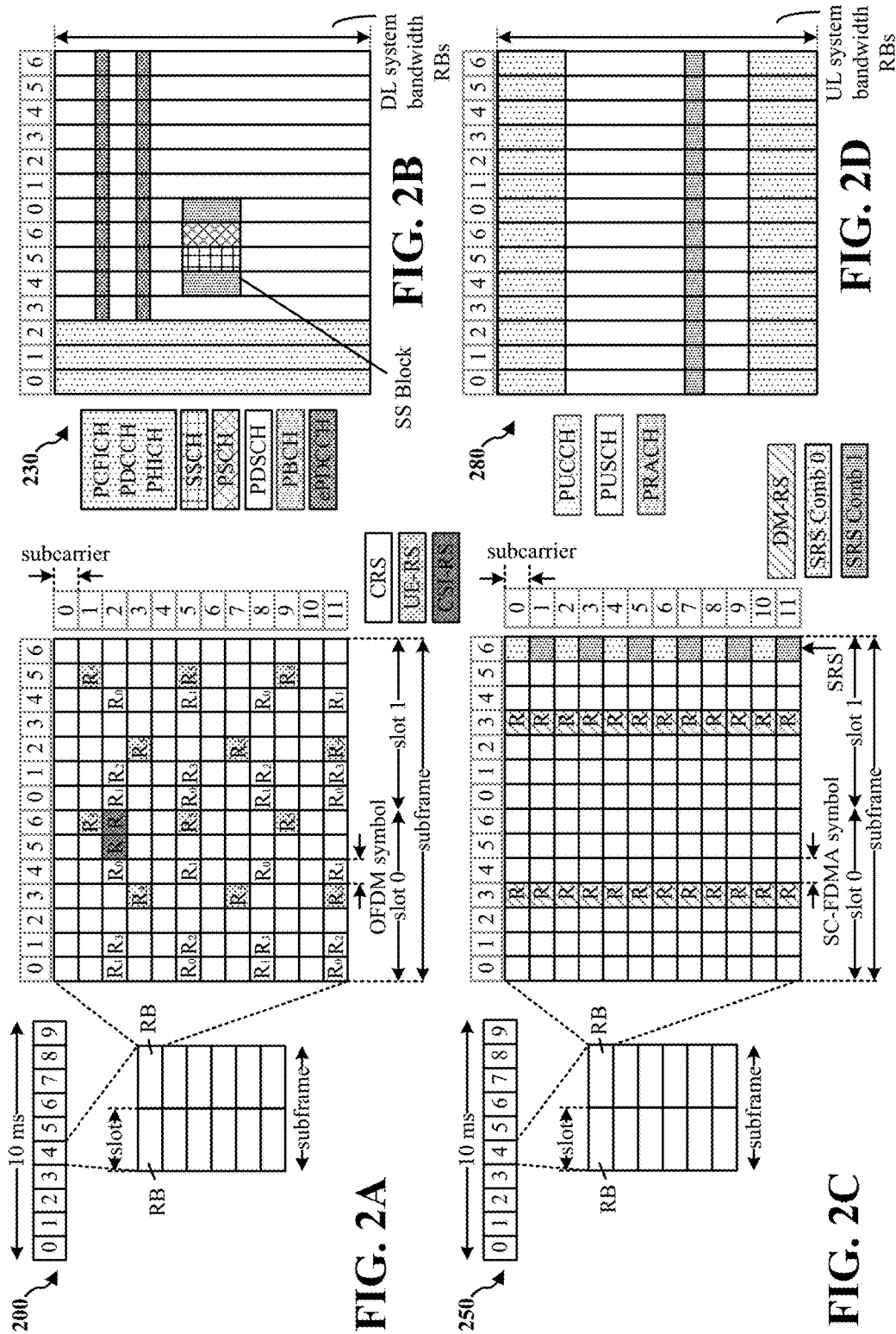
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
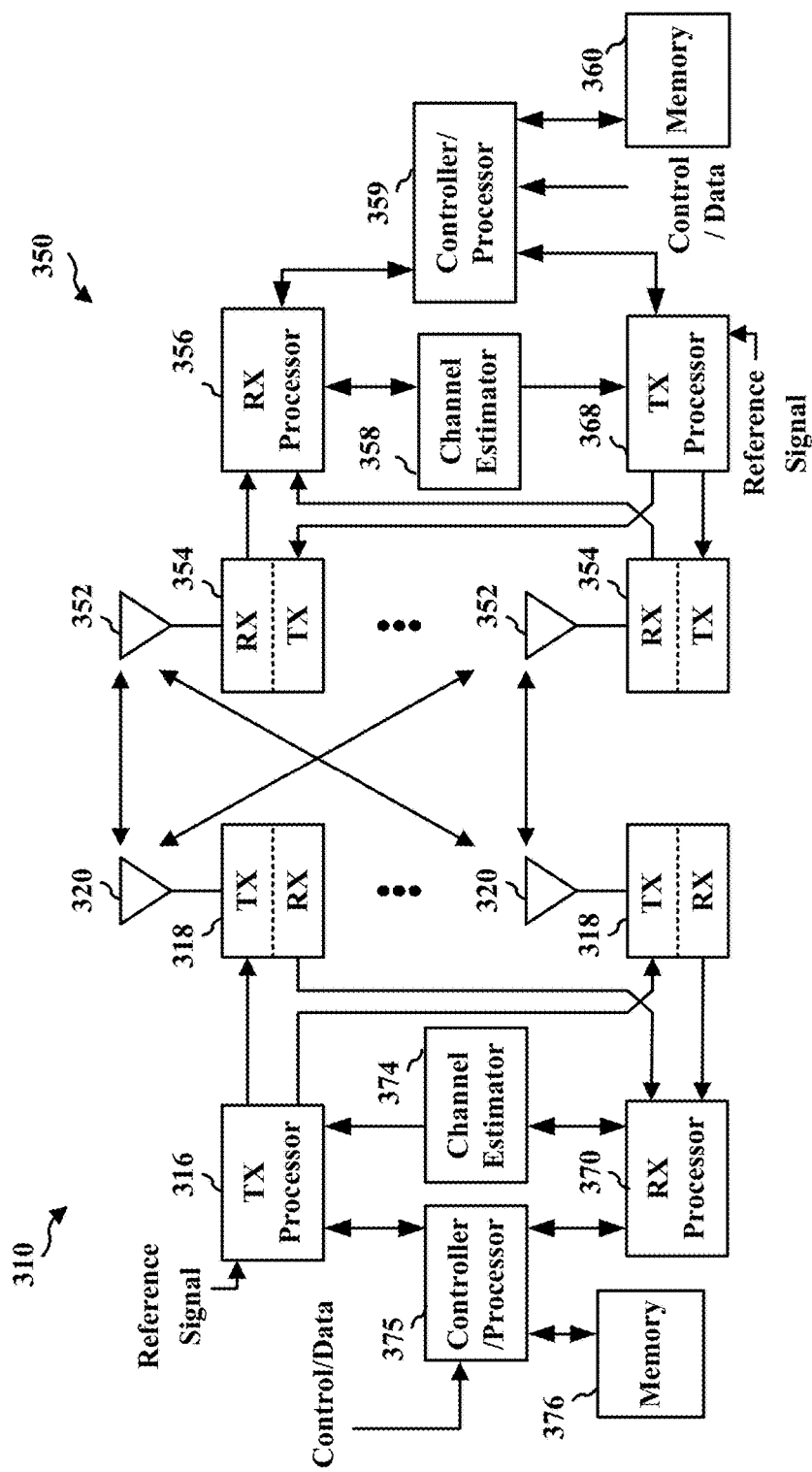
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
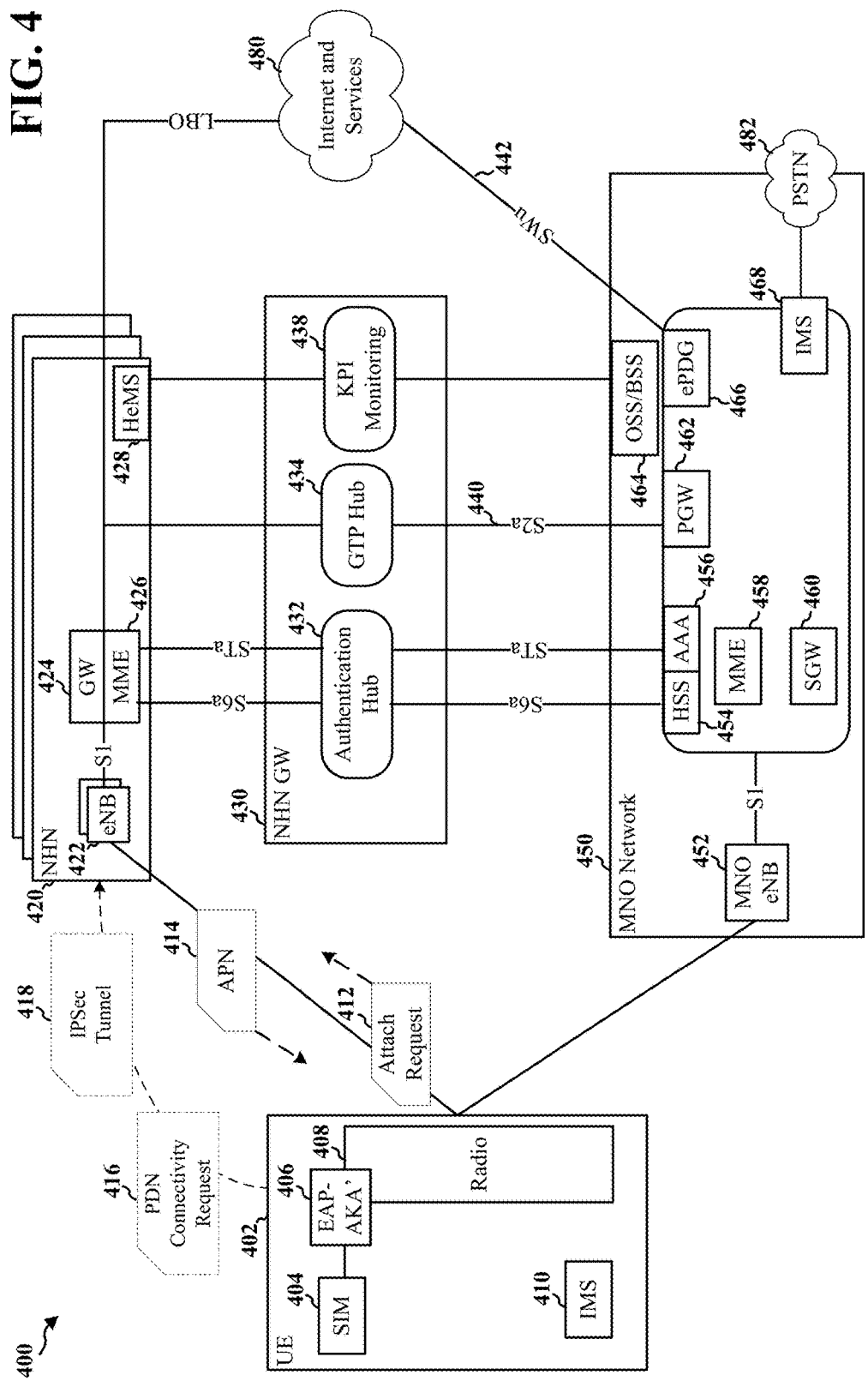
FIG. 4 is a diagram of a wireless communications system.

FIG. 4 is a diagram of a wireless communications system 400. In aspects, the wireless communications system 400 may include at least one UE 402, an NHN 420, an NHN gateway (GW) 430, and a network 450 of an MNO. In an aspect, the wireless communications system 400 may include an LTE and/or LTE-Advanced network (e.g., the MNO network 450 may include an LTE or LTE-Advanced network), a 5G NR network, or another wireless network based on one or more wireless standards (e.g., a 3GPP standard).

An NHN 420 may provide a wireless network with connectivity (e.g., Internet connectivity) servicing one or more UEs (e.g., the UE 402). The NHN 420 may provide scalable network deployments to service UEs from a plurality service providers of a plurality of mobile networks. In an aspect, the NHN 420 may be self-contained. The NHN 420 may operate based on one or more wireless standards, such as LTE, LTE-Unlicensed (LTE-U), LTE-A, License Assisted Access (LAA), 5G NR, Wi-Fi, and/or other radio access technologies (e.g., a trusted non-3GPP access network).

The MulteFire Alliance may specify an NHN architecture based on 3GPP Evolved Packet System (EPS) architecture. This architecture may allow self-contained deployment of NHNs independently by venues and enterprises with relatively minimal interworking with MNOs (e.g., the MNO associated with the network 450). In an aspect, the NHN 420, including the NHN GW 430, may include a MulteFire network.

In various aspects, the NHN 420 may support home-routed traffic and/or local breakout (LBO). For home-routed traffic, the NHN 420 may route traffic associated with the UE 402 through a home network 450 of the UE—e.g., the NHN may route traffic through a gateway associated with the MNO network 450 that services the UE. For example, the NHN 420 may route a request to a PDN from the UE 402 to a PGW 462 of a home PLMN of the UE 402 (e.g., the MNO network 450). For LBO, the NHN 420 may refrain from routing traffic through the home network 450 of the UE 402. Instead, the NHN 420 may provide network access and connectivity (e.g., Internet connectivity) to the UE 402. For example, the NHN may route a request to a PDN to a GW 424 associated with the NHN 420.

In some aspects, networks (e.g., NHN 420 and MNO network 450) may operate with overlapping coverage areas. For example, a MulteFire network may include APs and/or eNB(s) 422 communicating in an unlicensed radio frequency spectrum band (e.g., without a licensed frequency anchor carrier). For example, the MulteFire network may operate without an anchor carrier in the licensed spectrum. While the present disclosure references eNBs (e.g., eNB 422, eNB 452), one of ordinary skill will appreciate that the present disclosure is applicable to other base station implementations, such as gNBs.

The UE 402 may be an aspect of the UE 104 of FIG. 1 and/or the UE 350 of FIG. 3. In various aspects, the UE 402 may be configured to operate based on a MulteFire standard in the wireless communications system 400 (e.g., the UE 402 may be configured to communicate over an unlicensed spectrum, for example, based on an LTE-U and/or LAA standard). According to various aspects, the UE 402 may include at least a subscriber identity module (SIM) 404, an Extensible Authentication Protocol Method for Universal Mobile Telecommunications System (UMTS) Authentication and Key Agreement (EAP-AKA) Prime (EAP-AKA') component 406, a radio 408, and an IP Multimedia Subsystem (IMS) component 410. The SIM 404 may be an integrated circuit that stores an international mobile subscriber identity (IMSI) associated with the UE 402. The SIM 404 may further include a key for authentication. The SIM 404 may be associated with an MNO. That is, the UE 402 may connect to a network 450 of the MNO using the SIM 404, and the UE 402 may receive services through the MNO network 450. Accordingly, the UE 402 may be associated with an MNO providing the MNO network 450.

The EAP-AKA' component 406 may provide an authentication mechanism and session key distribution in association with the SIM 404. The EAP-AKA' component 406 may provide non-3GPP access to a 3GPP core network.

The SIM 404 and the EAP-AKA' component 406 may be communicatively coupled with a radio 408. The radio 408 may be, for example, an LTE radio, LTE-U radio, LAA radio, a radio associated with another wireless standard, or a radio configured to operate based on a plurality of wireless standards. In aspects, the radio 408 may include a PHY layer, as well as one or more other layers of a radio protocol architecture (e.g., an RRC layer, a PDCP layer, an RLC layer, and/or a MAC layer).

In aspects, the UE 402 may include an IMS component 410. The IMS component 410 may be configured to provide IP multimedia services for the UE 402. For example, the IMS component 410 may be configured to provide voice-over-IP (VoIP) services, voice-over-LTE (VoLTE), video-over-LTE (ViLTE), and/or other services through IP. The IMS component 410 may be configured to access IMS services available through the MNO providing the network 450 associated with the UE 402 via the radio 408.

The wireless communications system 400 may include at least one NHN 420. The NHN 420 may include at least one eNB 422 (e.g., the base station 102 and/or the base station 310). The eNB 422 may be configured to communicate with a GW 424 and/or an MME 426 of the NHN 420, for example, using an S1 interface. The MME 426 may include a control node that processes the signaling between the UE 402 and the NHN 420. For example, the MME 426 may provide bearer and connection management. The GW 424 may be configured to communicate with the Internet and Services 480 (e.g., IP services). In some aspects, the NHN 420 may provide, through the GW 424, LBO to various devices (e.g., the UE 402) operating in the NHN 420.

The NHN 420 may further include a home eNB management system (HeMS) 428. The HeMS 428 may be configured to provide various management functions for an eNB (e.g., the eNB 422), such as configuration management, fault management, and/or performance management. Further, the HeMS 428 may be configured to provide identity and location verification of an eNB (e.g., the eNB 422), as well as discovery and assignment of a serving HeMS, a serving GW (e.g., the GW 424), and/or an MME (e.g., the MME 426).

In the NHN 420, the MME 426 may be configured to communicate with an NHN GW 430. The NHN GW 430 may provide a hub function for a plurality of NHN networks and/or facilitate communication between the NHN 420 and another network, such as the MNO network 450. In an aspect, the NHN GW 430 includes an authentication hub 432. The authentication hub 432 may provide authentication services for communication between the NHN 420 and another network, such as the MNO network 450. In aspects, the MME 426 may communicate with an HSS of another network, e.g., the HSS 454 using an S6a interface, through the authentication hub 432. In an aspect, the MME 426 may be further configured to communicate, through the authentication hub 432, with an Authentication, Authorization, and Accounting (AAA) service of another network, e.g., the AAA 456 using an STa interface.

In an aspect, the NHN GW 430 may further include a general radio packet service (GPRS) tunneling protocol (GTP) hub 434. In an aspect, traffic from the MME 426 may be communicated to another GW through the GTP hub 434. For example, the MME 426 may route traffic to the PGW 462 of the MNO network 450 using an S2a interface 440.

In an aspect, the NHN GW 430 may further include a key performance indicator (KPI) monitoring component 438. In an aspect, the HeMS 238 may be configured to communicate through the KPI monitoring component 438, for example, with an operations support system (OSS)/business support system (BSS) 464 of the MNO network 450.

As described, supra, the MNO network 450 may be a network associated with the UE 402—e.g., the MNO network 450 may be a home network of the UE 402. The MNO network 450 may include at least an MNO eNB 452 (e.g., the base station 102 and/or the base station 310). The MNO eNB 452 may be configured to communicate with various components of the MNO network 450, for example, using an S1 interface. The MNO network 450 may further include an HSS 454, an AAA 456, an MME 458, an SGW 460, and a PGW 462.

According to aspects, the MNO network 450 provides an IMS service 468. Examples of IMS service 468 include IMS voice and/or video service, VoLTE, ViLTE, Rich Communication Services (RCS), and/or another IP multimedia service. In an aspect, the IMS service 468 may be communicatively coupled with a public-switched telephone network (PSTN) 482, e.g., for IMS voice calling. In aspects, the MNO network 450 further includes an ePDG 466. The ePDG 466 may provide secure access to an EPC network (e.g., EPC 160), for example, using tunnel authentication and authorization. Through the ePDG 466, traffic to the IMS service 468 may be secure, for example, when communicated over the Internet and Services 480.

In an aspect, the UE 402 may need to register with a network, for example, in order to receive an IMS service (e.g., when the UE 402 is turned on, when an IMS service is requested, and/or when a home network of the UE 402 is unavailable). Accordingly, the UE 402 may perform an attach procedure to register with a network. The UE 402 may be within a coverage area of an eNB 422 of the NHN 420. The UE 402 may generate an attach request 412 to register with the NHN 420. However, the UE 402 may not specify an APN in the attach request 412. For example, the NHN 420 may not be a home network of the UE 402 and, therefore, the UE 402 may need to determine how to connect to a home network (e.g., the MNO network 450) through the NHN 420. In aspects, the attach request 412 may include an IMSI of the UE 402 (e.g., from the SIM 404). The UE 402 may transmit the attach request 412 to the eNB 422 of the NHN 420, and the eNB 422 may provide this attach request 412 to the MME 426 of the NHN 420.

In aspects, the MME 426 may receive the attach request 412. Based on the attach request 412, the MME 426 may determine whether home-routed traffic is supported between the MNO network 450 and the UE 402. In an aspect, the MME 426 may identify an MNO associated with the UE 402 based on the attach request 412. For example, the MME 426 may identify an IMSI associated with the UE 402 in the attach request 412. The MME 426 may identify the MNO providing the network 450 and associated with the UE 402 from the IMSI.

Based on identification of the MNO providing the network 450, the MME 426 may be configured to determine whether home-routed traffic is supported between the MNO network 450 and the UE 402. In an aspect, the MME 426 may access a policy that indicates whether home-routed traffic is supported by the NHN 420 for the MNO providing the MNO network 450. A policy may include stored data accessible by the MME 426 defining an agreement or cooperation between the NHN 420 and the MNO providing the MNO network 450. Accordingly, the MME 426 may access such stored data to identify whether the stored data indicates the NHN 420 is allowed to route traffic between the UE 402 associated with the MNO and the network 450 provided by the MNO. In another aspect, the MME 426 may determine whether the NHN 420 is communicatively coupled with the MNO network 450—such as by determining whether a path exists in the wireless communications system 400 allowing the NHN 420 to communicate with the MNO network 450. When the NHN 420 is not communicatively coupled with the MNO network 450, then the NHN 420 may be unable to route traffic between the UE 402 and the MNO network 450.

Based on the determination of whether the home-routed traffic is supported between the MNO network 450 and the UE 402, the MME 426 may determine an APN 414 for the UE 402. The APN 414 may indicate a PLMN identifier (ID). A PLMN ID may be at least one value (e.g., a value, a tuple, etc.) that identifies a PLMN. An example of a PLMN ID includes a mobile country code (MCC) and a mobile network code (MNC), which may be a tuple. Such an example may be applicable to MNOs. In another example, an NHN PLMN ID (e.g., an NHN PLMN ID associated with the NHN 420) may be an ID associated with the NHN, such as an ID assigned by a central organization or selected by the NHN deployment (e.g., random selection).

If home-routed traffic is not supported, the MME 426 may determine that the APN 414 for the UE 402 should be an NHN PLMN ID. In such an aspect, the NHN 420 may support LBO, e.g., the NHN 420 may provide Internet connectivity for the UE 402 (e.g., the Internet and Services 480) but does not route traffic associated with the UE 402 between the MNO network 450. According to an example, the APN 414 may be Internet-4.apn.epc.mnc910.mcc487.3gppnetwork.org, where 910-487 is a PLMN ID reserved for the NHN 420.

If home-routed traffic is supported, the MME 426 may determine that the APN 414 for the UE 402 should be an MNO PLMN ID. In such an aspect, the NHN 420 may support home-routed traffic, e.g., the NHN 420 may route traffic from the UE 402 to the MNO network 450 using the S2a interface 440. According to an example, the APN 414 may be Internet-4.apn.epc.mnc111.mcc222.3gppnetwork.org, where 111-222 is a PLMN ID reserved for the MNO network 450.

The MME 426 may then provide the APN 414 to the UE 402, e.g., through the eNB 422. The UE 402 may receive the APN 414. As described, supra, the APN 414 may indicate either an NHN PLMN ID or an MNO PLMN ID. The UE 402 may be configured to determine, from the APN 414, whether the PLMN ID is an NHN PLMN ID or an MNO PLMN ID. For example, the UE 402 may identify, in the APN 414, the PLMN ID. The UE 402 may compare the PLMN ID identified from the APN 414 to at least one value (e.g., tuple) stored by the UE 402 that indicates the PLMN ID of the MNO associated with the UE 402 (e.g., the at least one value may be stored in association with the SIM 404).

In an aspect, the UE 402 may determine that the NHN 420 supports home-routed traffic to the MNO network 450 when the APN 414 indicates the MNO PLMN ID. For example, the UE 402 may determine whether the PLMN ID identified from the APN 414 matches or corresponds to an MNO PLMN ID stored at the UE 402. When the PLMN ID identified from the APN 414 matches or corresponds to an MNO PLMN ID stored at the UE 402, the UE 402 may determine that the NHN 420 does support home-routed traffic.

In an aspect, the UE 402 may determine that the NHN 420 does not support home-routed traffic (e.g., the NHN 420 supports LBO) when the APN indicates the NHN PLMN ID. For example, the UE 402 may determine whether the PLMN ID identified from the APN 414 matches or corresponds to an MNO PLMN ID stored at the UE 402. When the PLMN ID identified from the APN 414 does not match or correspond to an MNO PLMN ID stored at the UE 402, the UE 402 may determine that the NHN 420 does not support home-routed traffic. In another example, the UE 402 may determine that the PLMN ID identified from the APN 414 is associated with an NHN, such as by determining that the PLMN ID identified from the APN 414 does not include a valid or recognized MCC and MNC, by determining that the PLMN ID identified from the APN 414 is of a format corresponding to an NHN deployment, and/or by determining that the PLMN ID identified from the APN 414 includes at least one value (e.g., tuple) reserved for NHN deployments.

Based on whether the NHN 420 supports home-routed traffic, the UE 402 may connect to the MNO network 450 using one of a plurality of approaches. If UE 402 determines that the NHN 420 supports home-routed traffic, then the UE 402 may initiate a PDN connectivity procedure, for example, to access an IMS service via IMS component 410 (e.g., initiate an IMS voice call). In an aspect, the UE 402 may transmit, to the NHN 420, a PDN connectivity request 416. In an aspect, the UE 402 may perform one or more operations in accordance with a 3GPP Technical Specification (TS), such as 3GPP TS 23.401, § 5.10.2 (titled, "UE requested PDN connectivity"). For example, the UE 402 may send the PDN connectivity request 416 as described in 3GPP TS 23.401, § 5.10.2.

If UE 402 determines that the NHN 420 does not support home-routed traffic, then the UE 402 may connect to the MNO network 450 by establishing an IPsec tunnel 418 to the ePDG 466, for example, to access an IMS service via IMS component 410 (e.g., initiate an IMS voice call). The UE 402 may receive Internet connectivity (e.g., LBO to Internet and Services 480) from the NHN 420 when the NHN 420 does not support home-routed traffic between the UE 402 and the MNO network 450. However, the UE 402 may connect to the MNO network 450 through the Internet and Services 480 using the NHN 420. The IPsec tunnel 418 established by the UE 402 to the ePDG 466 may be transparent to the NHN 420 (e.g., the NHN 420 views this IPsec tunnel as ordinary Internet traffic), but the UE 402 may receive the IMS service 468 provided by the MNO network 450. In an aspect, the UE 402 may communicate with the ePDG 466 using an SWu interface 442. In an aspect, the UE 402 may perform one or more operations in accordance with a 3GPP TS, such as 3GPP TS 23.402, § 7.2 (titled, "Initial Attach on S2b"). For example, the UE 402 may establish the IPsec tunnel 418 as described in 3GPP TS 23.402, § 7.2.

After connecting to the MNO network 450, the UE 402 may access the IMS service 468. For example, the UE 402 may establish an IMS voice call.

When the NHN 420 supports home-routed traffic, the MME 426 may receive the PDN connectivity request from the UE 402. Based on the PDN connectivity request, the MME 426 may establish a connection with the PGW 462. The MME 426 may then route traffic between the PGW 462 and the UE 402, for example, using the S2a interface 440.

When the NHN 420 does not support home-routed traffic, the MME 426 may provide connectivity to the UE 402 for the Internet and Services 480 (e.g., LBO). Using the established IPsec tunnel 418, the UE 402 may tunnel to the ePDG 466 via the NHN 420 in order to access IMS service 468. For example, the UE 402 may establish an IMS voice call over the IPsec tunnel 418 to the ePDG 466.

Figure 5:
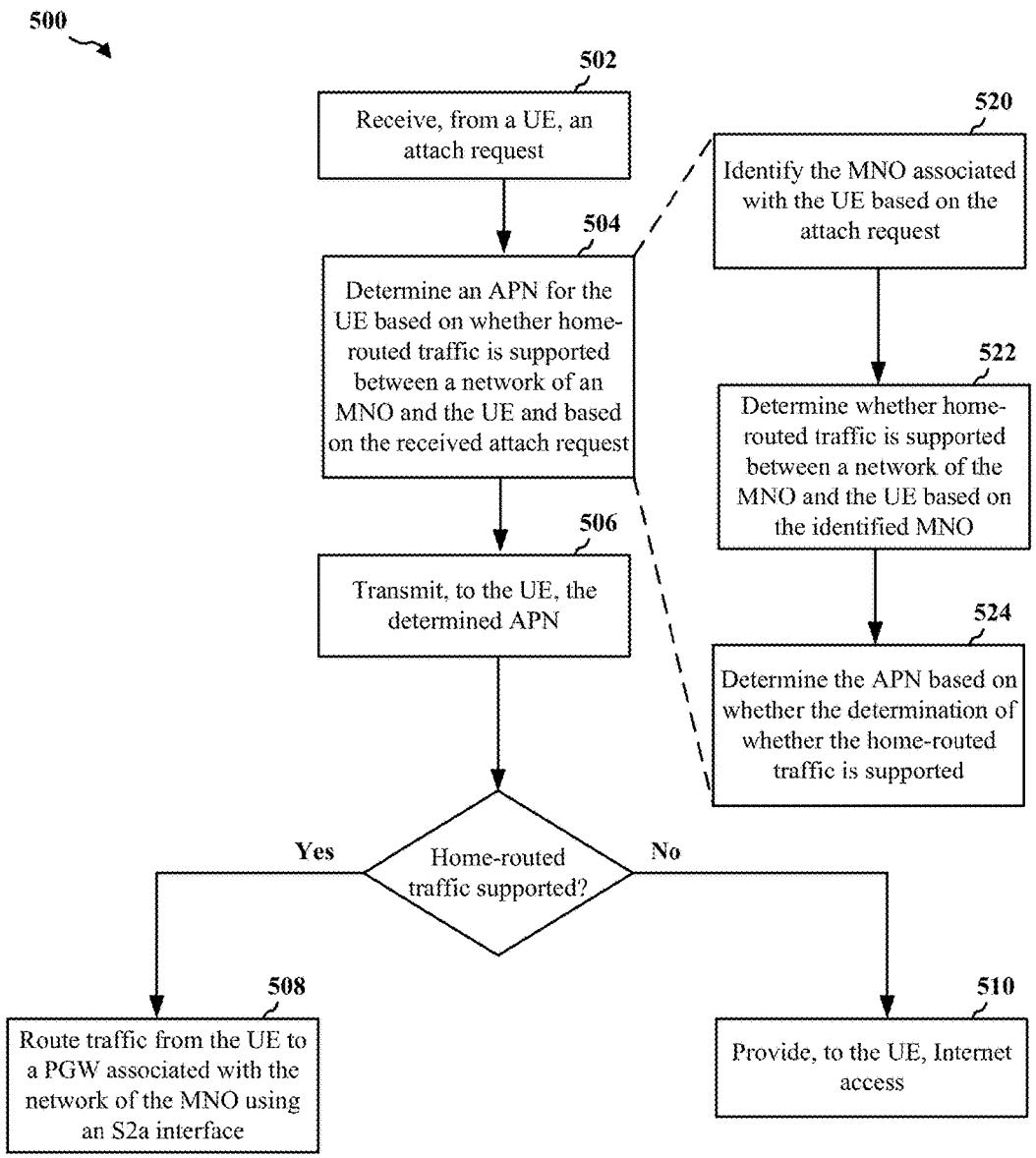
FIG. 5 is a flowchart of a method of wireless communication.

FIG. 5 is a flowchart of a method 500 of wireless communication. The method may be performed by an NHN system (e.g., the MME 426 of the NHN 420, the apparatus 702/702'). Although FIG. 5 illustrates a plurality of operations, one of ordinary skill will appreciate that one or more operations may be transposed and/or contemporaneously performed. Further, one or more operations of FIG. 5 may be optional (e.g., as denoted by dashed lines) and/or performed in connection with one or more other operations.

Beginning first with operation 502, the NHN system may receive, from a UE, an attach request. In aspects, the attach request may not specify an APN. The attach request may include an IMSI associated with the UE. In the context of FIG. 4, the MME 426 may receive, from the UE 402, the attach request 412.

At operation 504, the NHN system may determine an APN for the UE based on whether home-routed traffic is supported between a network of an MNO and the UE and based on the attach request. For example, the NHN system may identify an MNO associated with the UE. The NHN system may access a policy that indicates whether the NHN system is to provide home-routed traffic for UEs associated with the MNO and/or the NHN system may identify a path between the NHN system and a network provided by the identified MNO.

When home-routed traffic is supported, the NHN system may determine that the APN is to indicate an MNO PLMN ID. Accordingly, the MNO may identify a PLMN ID of the MNO and the NHN may generate an APN that includes the identified MNO PLMN ID. When home-routed traffic is not supported, then the NHN system may determine that the APN is to indicate an NHN PLMN ID. Accordingly, the MNO may identify an ID of the NHN to be used as a PLMN ID and the NHN may generate an APN that includes the identified NHN ID (included as an NHN PLMN ID).

In the context of FIG. 4, the MME 426 may determine the APN 414 for the UE 402. For example, the MME 426 may determine whether home-routed traffic to the MNO network 450 is supported. When the MME 426 determines that home-routed traffic to the MNO network is supported, the MME 426 may identify a PLMN ID associated with the MNO providing the network 450. When the MME 426 determines that home-routed traffic to the MNO is unsupported, the MME 426 may identify an ID of the NHN 420 to use as the PLMN ID. The MME 426 may generate an APN 414 that indicates the identified one of the MNO PLMN or the NHN PLMN ID.

In various aspects, operation 504 may include operation 520, operation 522, and operation 524. At operation 520, the NHN system may identify the MNO associated with the UE based on the attach request. For example, the NHN system detect an IMSI included in the attach request, and the NHN system may identify an MNO that corresponds to the identified IMSI. In the context of FIG. 4, the MME 426 may identify the MNO providing the network 450 from the IMSI included in the attach request 412.

At operation 522, the NHN system may determine whether home-routed traffic is supported between a network of the MNO and the UE based on the identified MNO. For example, the NHN system may access a policy that indicates whether the NHN system is to provide home-routed traffic for UEs associated with the MNO and/or the NHN system may identify a path between the NHN system and a network provided by the identified MNO. If the accessed policy indicates that home-routed traffic is supported for the MNO and/or a path is identified, then the NHN system may determine that home-routed traffic is supported between the network of the MNO and the UE. If the accessed policy indicates that home-routed traffic is unsupported for the MNO and/or a path is not identified, then the NHN system may determine that home-routed traffic is unsupported between the network of the MNO and the UE. In the context of FIG. 4, the MME 426 may determine whether home-routed traffic is supported between the MNO network 450 and the UE 402 based on the identified MNO (i.e., the MNO providing the network 450).

At operation 524, the NHN system may determine the APN based on the determination of whether home-routed traffic is supported, as described in operation 504. When home-routed traffic is supported, for example, the NHN system may identify at least one value (e.g., an MNC and MCC) associated with the MNO and may generate a network address that includes the identified at least one value (e.g., Internet-4.apn.epc.mnc111.mcc222.3gppnetwork.org, where 111-222 is the identified at least one value (e.g., 111 is the MNC and 222 is the MCC). When home-routed traffic is unsupported, for example, the NHN system may identify at least one value associated with the NHN and may generate a network address that includes the identified at least one value (e.g., Internet-4.apn.epc.mnc910.mcc487.3gppnetwork.org, where 111-222 is the identified at least one value (e.g., 910-487 may be a PLMN ID reserved for NHN deployments).

At operation 506, the NHN system may transmit, to the UE, the determined APN. For example, the NHN system may provide the determined APN to a system (e.g., base station) and indicate to the system to send the determined APN to the UE based on the attach request received from the UE (e.g., the NHN system may identify the UE in association with the determined APN). In the context of FIG. 4, the MME 426 may transmit, to the UE 402 through the eNB 422, the APN 414.

If home-routed traffic is supported between the UE and the MNO network, then the NHN system may provide PDN connectivity to the UE. Thus, at operation 508, the NHN system may route traffic associated with the UE to a PGW of the MNO network using an S2a interface. In an aspect, the NHN system may receive a PDN connectivity request from the UE to establish the connection to the PGW for the UE. The NHN system may establish a PDN connection between the UE and the PGW based on the PDN connectivity request. Using the PDN connection, the NHN system may route traffic to and from the UE to the PGW through the NHN. In the context of FIG. 4, the MME 426 may route traffic associated with the UE 402 through the PGW 462 using the S2a interface 440. In aspects, the MME 426 may establish a connection to the PGW 462 based on a PDN connectivity request received from the UE 402.

If home-routed traffic is unsupported between the UE and the MNO network, then the NHN system may provide Internet connectivity to the UE, such as through LBO. Thus, at operation 510, the NHN system may provide Internet access to the UE. For example, the NHN system may cause traffic associated with the UE to be routed through a GW of the NHN, and the NHN system may provide Internet connectivity to the UE through the NHN. In the context of FIG. 4, the MME 426 may provide access to the Internet and Services 480 to the UE 402 (e.g., through LBO) when the NHN 420 does not support home-routed traffic between the UE 402 and the MNO network 450. For example, the MME 426 may cause traffic associated with the UE 402 to be routed through GW 424, and the MME 426 may provide connectivity to Internet and Services 480 through the NHN 420.

Figure 6:
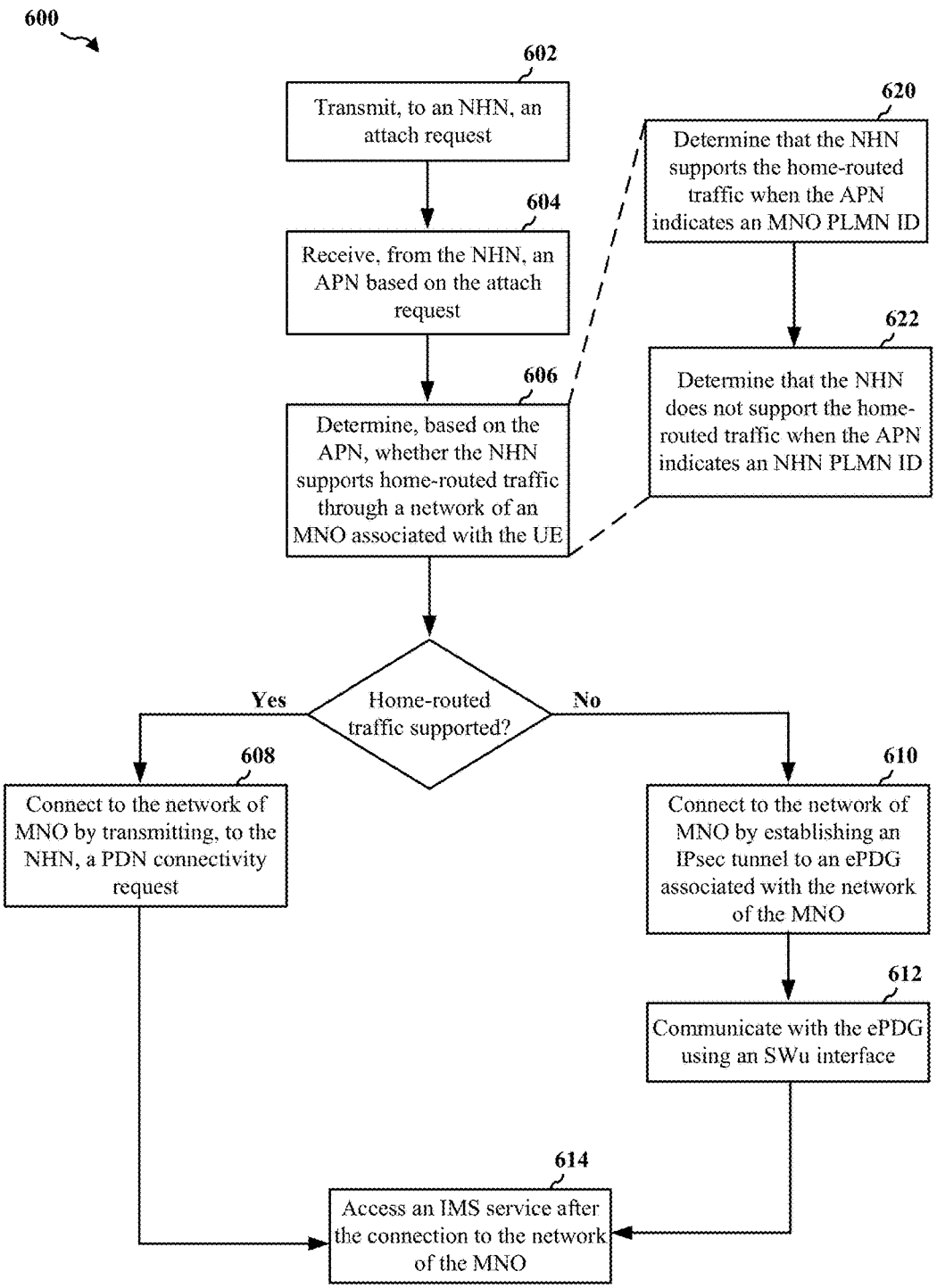
FIG. 6 is a flowchart of a method of wireless communication.

FIG. 6 is a flowchart of a method 600 of wireless communication. The method may be performed by a UE (e.g., the UE 402, the apparatus 902/902'). Although FIG. 6 illustrates a plurality of operations, one of ordinary skill will appreciate that one or more operations may be transposed and/or contemporaneously performed. Further, one or more operations of FIG. 6 may be optional (e.g., as denoted by dashed lines) and/or performed in connection with one or more other operations.

Beginning first with operation 602, the UE may transmit, to an NHN, an attach request. In aspects, the attach request may not specify an APN. The attach request may include an IMSI. For example, the UE may identify an IMSI associated with the UE, and the UE may generate an attach request that includes the identified IMSI but does not define an APN. In the context of FIG. 4, the UE 402 may transmit, to the NHN 420, the attach request 412. The UE 402 may generate the attach request 412 based on an IMSI associated with the SIM

404 (e.g., the UE 402 may generate an attach request that includes an IMSI stored by the SIM 404).

At operation 604, the UE may receive, from the NHN, an APN based on the attach request. For example, the UE may be scheduled to receive a downlink message from the NHN, and the UE may listen or detect for the downlink message on scheduled resource(s). The UE may then receive the downlink message, which includes the APN. In an aspect, the APN may indicate either an NHN PLMN ID or an MNO PLMN ID. For example, the APN may include a network address, and the network address may indicate at least one value associated with a PLMN ID. In the context of FIG. 4, the UE 402 may receive, from the NHN 420 through the eNB 422, the APN 414.

At operation 606, the UE may determine, based on the APN, whether the NHN supports home-routed traffic through a network of an MNO associated with the UE. For example, the UE may identify at least one value included in the APN that is associated with a PLMN ID. The UE may then determine if the identified PLMN ID is associated with an MNO associated with the UE or if the identified PLMN ID is associated with the NHN.

In the context of FIG. 4, the UE 402 may determine, based on the APN 414, whether the NHN 420 supports home-routed traffic through the MNO network 450. For example, the UE 402 may determine whether the PLMN identified in the APN 414 matches or corresponds to a PLMN ID of the MNO providing the network 450 and, therefore, the NHN 420 supports home-routed traffic. In another example, the UE 402 may determine that the PLMN identified in the APN 414 is not the PLMN ID of the MNO providing the network 450 and/or is associated with the NHN 420 and, therefore, may determine that home-routed traffic is unsupported by the NHN 420.

In various aspects, operation 606 may include operation 620 and operation 622. At operation 620, the UE may determine that the NHN supports home-routed traffic when the APN indicates an MNO PLMN ID. In one aspect, the UE may compare the PLMN ID identified from the APN to an MNO PLMN ID stored at the UE (e.g., an MNO PLMN ID associated with an MNO that provides a home network to the UE). When the PLMN ID identified from the APN matches or corresponds to an MNO PLMN ID stored at the UE, the UE may determine that the NHN does support home-routed traffic. In the context of FIG. 4, the UE 402 may determine that the NHN 420 supports home-routed traffic when the APN 414 indicates a PLMN ID associated with the MNO providing the network 450.

At operation 622, the UE may determine that the NHN does not support home-routed traffic when the APN indicates an NHN PLMN ID. In one aspect, the UE may compare the PLMN ID identified from the APN to an MNO PLMN ID stored at the UE (e.g., an MNO PLMN ID associated with an MNO that provides a home network to the UE). When the PLMN ID identified from the APN does not match or correspond to an MNO PLMN ID stored at the UE, the UE may determine that the NHN does not support home-routed traffic. In another aspect, the UE may determine that the PLMN ID identified from the APN is associated with an NHN. When the UE determines that the PLMN ID identified from the APN is associated with an NHN, the UE may determine that the NHN does not support home-routed traffic. In the context of FIG. 4, the UE 402 may determine that the NHN 420 does not support home-routed traffic when the APN 414 indicates an NHN PLMN ID (e.g., a PLMN ID associated with the NHN 420).

Based on the determination of whether the NHN supports home-routed traffic, the UE may connect to the network of the MNO. If the NHN supports home-routed traffic, the method 600 may proceed to operation 608. At operation 608, the UE may connect to the network of the MNO by transmitting, to the NHN, a PDN connectivity request. For example, the UE may generate a PDN connectivity request, transmit the generated PDN connectivity request to the NHN, and establish a PDN connection through the NHN. Thus, traffic from the UE may be routed to the network of the MNO while the UE is attached to the NHN. In the context of FIG. 4, the UE 402 may transmit, to the NHN 420, a PDN connectivity request, and traffic from the UE 402 may be routed to the MNO network 450 using the S2a interface 440.

If the NHN does not support home-routed traffic, the method 600 may proceed to operation 610. At operation 610, the UE may connect to the network of the MNO by establishing an IPsec tunnel to an ePDG associated with the network of the MNO. In effect, the UE may cause traffic from the UE to reach the MNO network using the Internet connectivity provided by the NHN (e.g., through LBO). For example, the UE may transmit a request associated with an IPsec tunnel to the ePDG, through the Internet connectivity provided by the NHN via LBO. Based on the request, the UE and the ePDG may establish an IPsec tunnel associated with IMS services of the MNO network. In the context of FIG. 4, the UE 402 may establish an IPsec tunnel 418 to the ePDG 466 through the Internet and Services 480, which are provided through LBO by the NHN 420.

At operation 612, the UE may communicate with the ePDG using an SWu interface. This communication may be transparent to the NHN (e.g., the NHN may view this communication using the SWu interface as conventional Internet traffic). For example, the UE may generate data (e.g., IMS traffic) and may cause this traffic to be transmitted over the established IPsec tunnel. In the context of FIG. 4, the UE 402 may communicate with the ePDG 466 using the SWu interface 442.

After connecting to the network of the MNO (e.g., as described at operation 608 or at operations 610, 612), the UE may access an IMS service, such as IMS voice. For example, the UE may generate traffic and cause this traffic to be sent to the MNO network for the IMS service. In an aspect, the traffic may be IMS multimedia, such as voice or video calling. In the context of FIG. 4, the IMS component 410 of the UE 402 may access the IMS service 468 provided by the MNO network 450. For example, the UE 402 may access IMS voice calling through the IMS service 468 and/or connect to PSTN 482.

Figure 7:
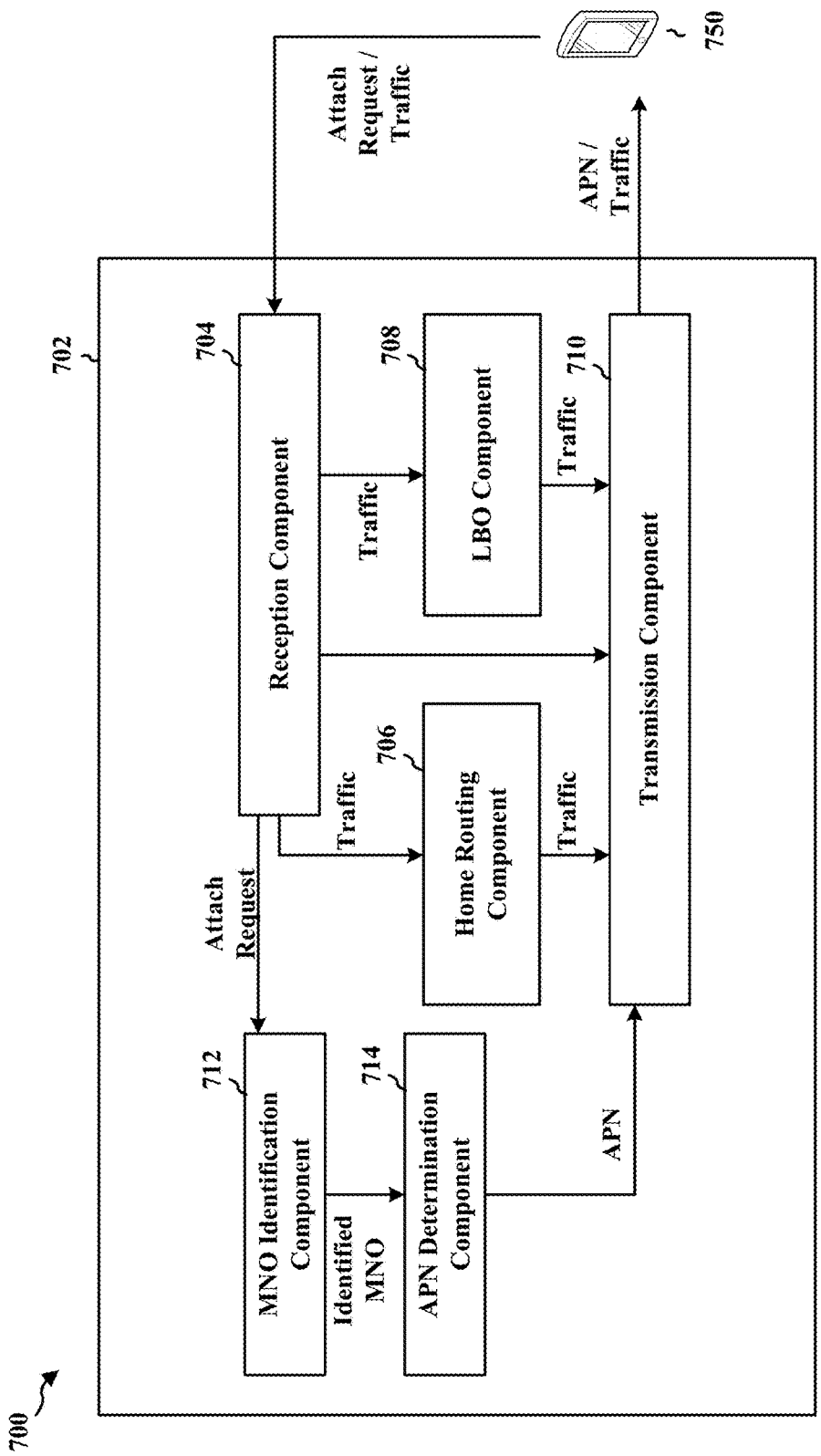
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a part of an NHN system, e.g., the MME 426 of the NHN 420. The apparatus includes a reception component 704 configured to receive signals, e.g., from the UE 750. In an aspect, the reception component 704 may receive, from the UE 750, an attach request. The reception component 704 may provide the attach request to an MNO identification component 712.

The MNO identification component 712 may be configured to identify an MNO associated with the UE 750. In an aspect, the MNO identification component 712 may be configured to identify an IMSI associated with the UE 750 from the attach request. The MNO identification component 712 may be configured to identify an MNO associated with the UE 750 based on the IMSI. The MNO identification component 712 may provide the identified MNO to an APN determination component 714.

The APN determination component 714 may be configured to determine an APN for the UE 750 based on whether home-routed traffic is supported between a network of the MNO and the UE 750. In an aspect, the APN determination component 714 may determine whether home-routed traffic is supported by checking a policy that indicates whether home-routed traffic is supported for the identified MNO. If the home-routed traffic is supported for the MNO, the APN determination component 714 may determine that the APN is to indicate an MNO PLMN ID. If the home-routed traffic is not supported for the MNO, the APN determination component 714 may determine that the APN is to indicate an NHN PLMN ID. The APN determination component 714 may then provide the APN to a transmission component 710, and the transmission component 710 may cause transmission of the determined APN to the UE 750.

The reception component 704 may further receive traffic from the UE 750. If home-routing traffic is supported between a network of the MNO and the UE 750, then the reception component 704 may provide the traffic to a home routing component 706. The home routing component 706 may be configured to route traffic from the UE to a PGW associated with the network of the MNO using an S2a interface. If home-routing traffic is not supported, then the reception component 704 may provide the traffic to an LBO component 708. The LBO component 708 may be configured to provide, to the UE 750, Internet access (e.g., through LBO).

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
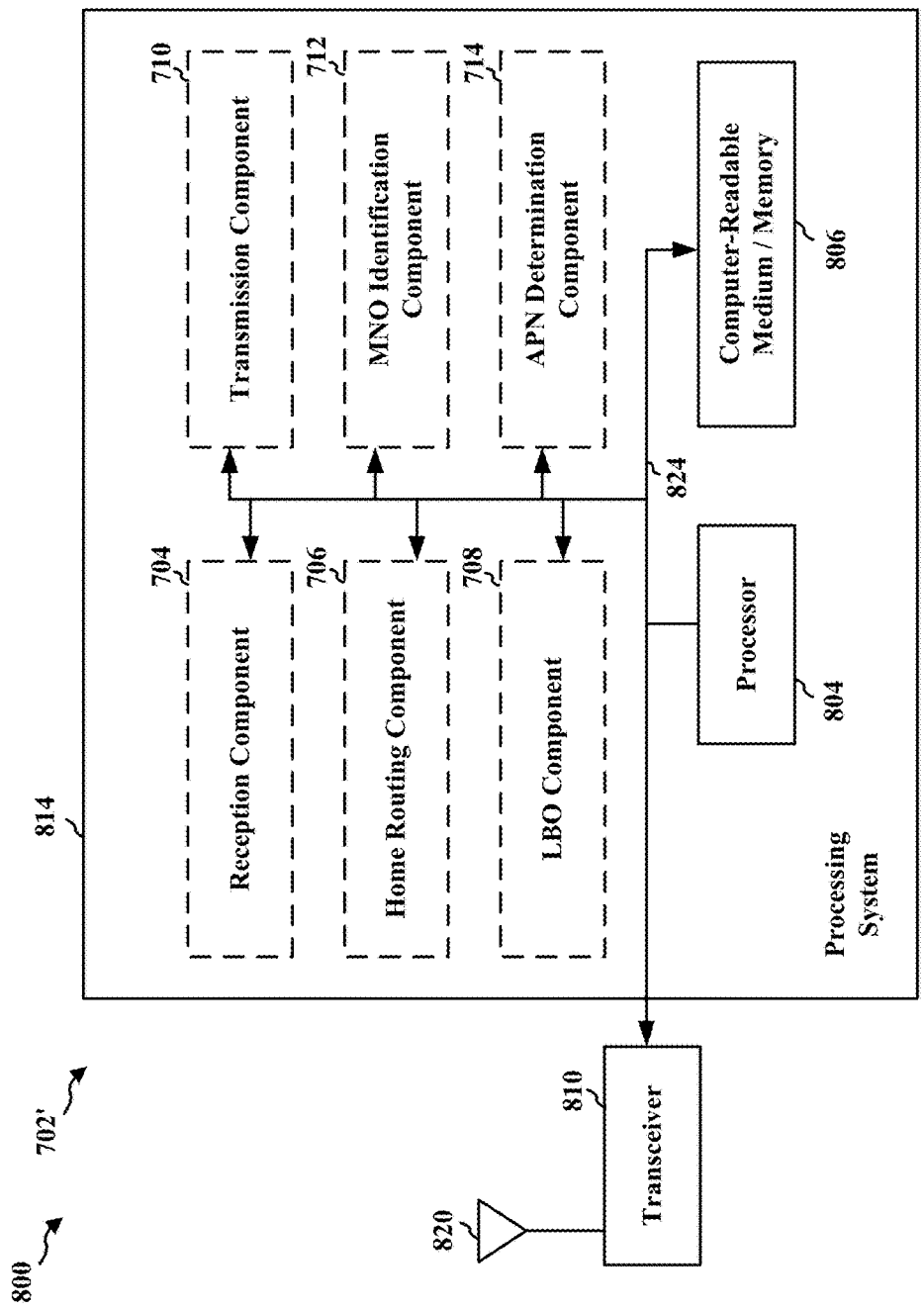
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 710, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714. The components may be software components running in the processor 804, resident/stored in the computer readable medium/memory 806, one or more hardware components coupled to the processor 804, or some combination thereof. The processing system 814 may be a component of an MME, such as the MME 426. However, the processing system 814 may include one or more components described in FIG. 3 with respect to the eNB 310, such as the memory 376 and/or at least one of the TX processor 316, the RX processor 370, and the controller/processor 375.

In one configuration, the apparatus 702/702' for wireless communication includes means for receiving, from a UE, an attach request. The apparatus 702/702' may further include means for determining an APN for the UE based on whether home-routed traffic is supported between a network of a MNO and the UE and based on the received attach request. The apparatus 702/702' may further include means for transmitting the determined APN to the UE. In an aspect, an APN is unspecified in the attach request. In an aspect, the APN indicates an MNO PLMN ID or an NHN PLMN ID. In an aspect, the means for determining the APN based on whether home-routed traffic is supported between the network of the MNO and the UE and based on the received attach request is configured to identify the MNO associated with the UE based on the attach request, determine whether home-routed traffic is supported based on the identified MNO, and determine the APN based on the determination of whether home-routed traffic is supported. In an aspect, the attach request includes an IMSI associated with the UE, and wherein the identification of the MNO associated with the UE is based on the IMSI. The apparatus 702/702' may further include means for routing traffic from the UE to a PGW associated with the network of the MNO using an S2a interface based on whether home-routed traffic is supported. The apparatus 702/702' may further include means for providing, to the UE, Internet access based on whether home-routed traffic is not supported.

The aforementioned means may be one or more of the aforementioned components of the apparatus 702 and/or the processing system 814 of the apparatus 702' configured to perform the functions recited by the aforementioned means. While the processing system 814 may be included in an MME or other component of an NHN, the processing system 814 may include the TX Processor 316, the RX Processor 370, and the controller/processor 375, as described supra. As such, in one configuration, the aforementioned means may be the TX Processor 316, the RX Processor 370, and the controller/processor 375 configured to perform the functions recited by the aforementioned means.

Figure 9:
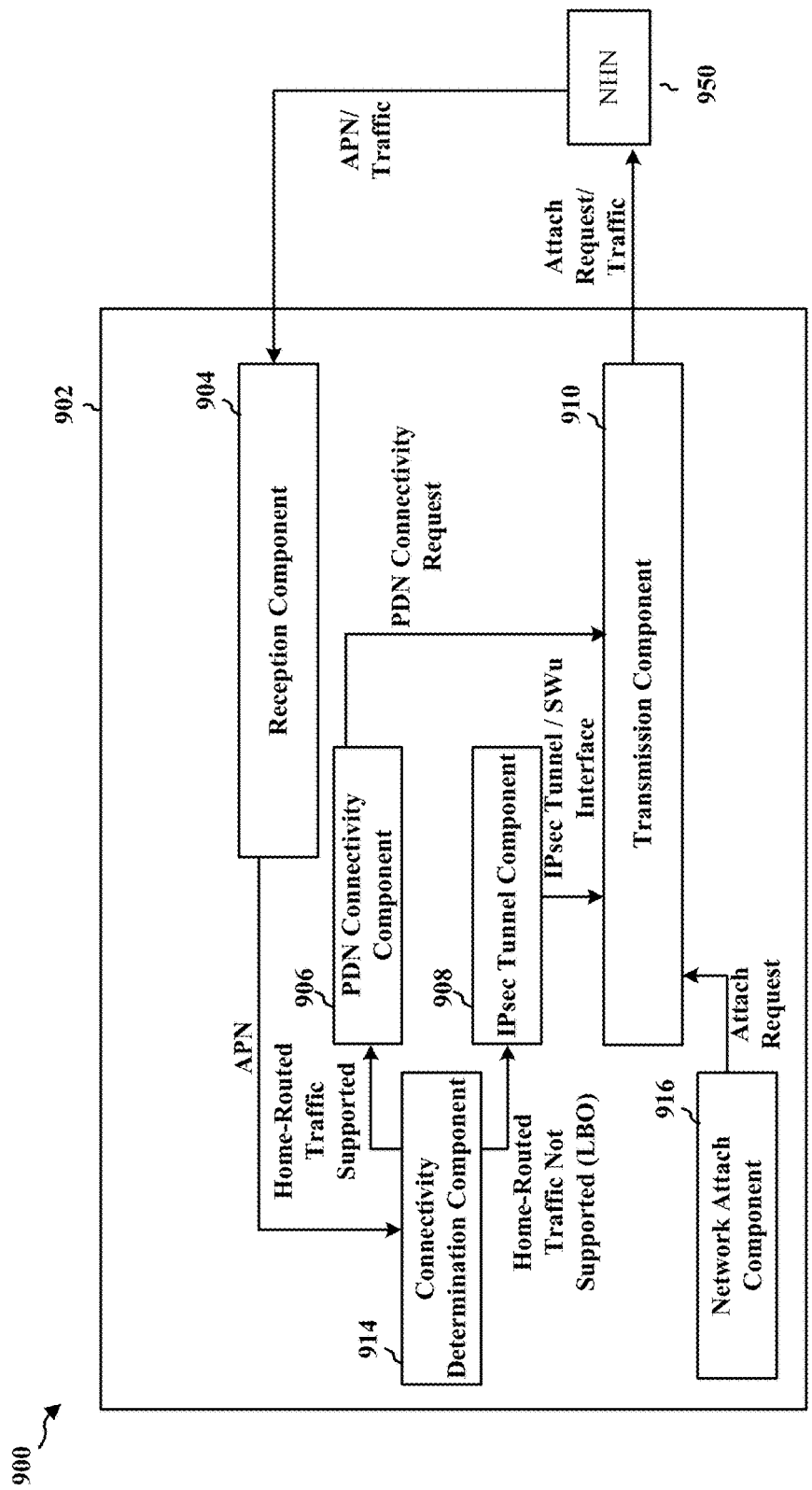
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE. The apparatus includes a network attach component 916. The network attach component 916 may be configured to generate an attach request, for example, to register with an NHN. The attach request may not specify an APN. The attach request may indicate an IMSI associated with the apparatus 902. The network attach component 916 may provide the attach request to a transmission component 910. The transmission component 910 may transmit the attach request to the NHN 950 (e.g., to an MME of the NHN 950).

Based on the attach request, the reception component 904 may receive, from the NHN 950, an APN. The reception component 904 may be configured to provide the APN to a connectivity determination component 914. The connectivity determination component 914 may be configured to determine, based on the APN, whether the NHN 950 supports home-routed traffic through a network of an MNO associated with the apparatus 902. In an aspect, the APN indicates either an MNO PLMN ID or an NHN PLMN ID. The connectivity determination component 914 may be configured to identify the MNO PLMN ID or the NHN PLMN ID from the APN. The connectivity determination component 914 may be configured to determine that the NHN 950 supports home-routed traffic through a network of the MNO when the APN indicates the MNO PLMN ID. The connectivity determination component 914 may be configured to determine that the NHN 950 does not support home-routed traffic when the APN indicates the NHN PLMN ID.

If the connectivity determination component 914 determines that home-routed traffic is supported, the connectivity determination component 914 may provide an indication of such to a PDN connectivity component 906. The PDN connectivity component 906 may be configured to generate a PDN connectivity request, for example, so that the apparatus 902 may receive an IMS service that is routed to a network of the MNO associated with the apparatus 902. The PDN connectivity component 906 may provide this PDN connectivity request to the transmission component 910. The transmission component 910 may transmit, to the NHN 950, the PDN connectivity request. Thus, the apparatus 902 may connect to a network of the MNO through PDN connectivity, which may use an S2a interface between an MME of the NHN 950 and a PGW of the MNO network.

If the connectivity determination component 914 determines that home-routed traffic is not supported, the connectivity determination component 914 may provide an indication of such to an IPsec tunnel component 908. The IPsec tunnel component 908 may be configured to establish an IPsec tunnel to an ePDG associated with a network of the MNO, for example, so that the apparatus 902 may receive an IMS service through a secure tunnel even though traffic associated with that IMS service may traverse the pubic Internet. The IPsec tunnel component 908 may provide a request to establish the IPsec tunnel to the transmission component 910. The transmission component 910 may transmit, to an ePDG of the MNO network, the request through the NHN 950 (e.g., the NHN 950 may provide LBO). Thus, the apparatus 902 may connect to a network of the MNO through LBO. The IPsec tunnel component 908 may communicate with the ePDG using an SWu interface.

According to an aspect, the apparatus 902 may receive an IMS service from the MNO network after connecting to the MNO network. Traffic associated with that IMS service may be directed through the PDN connectivity component 906 when home-routed is supported by the NHN 950 or may be directed through the IPsec tunnel component 908 when home-routed traffic is not supported by the NHN 950.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
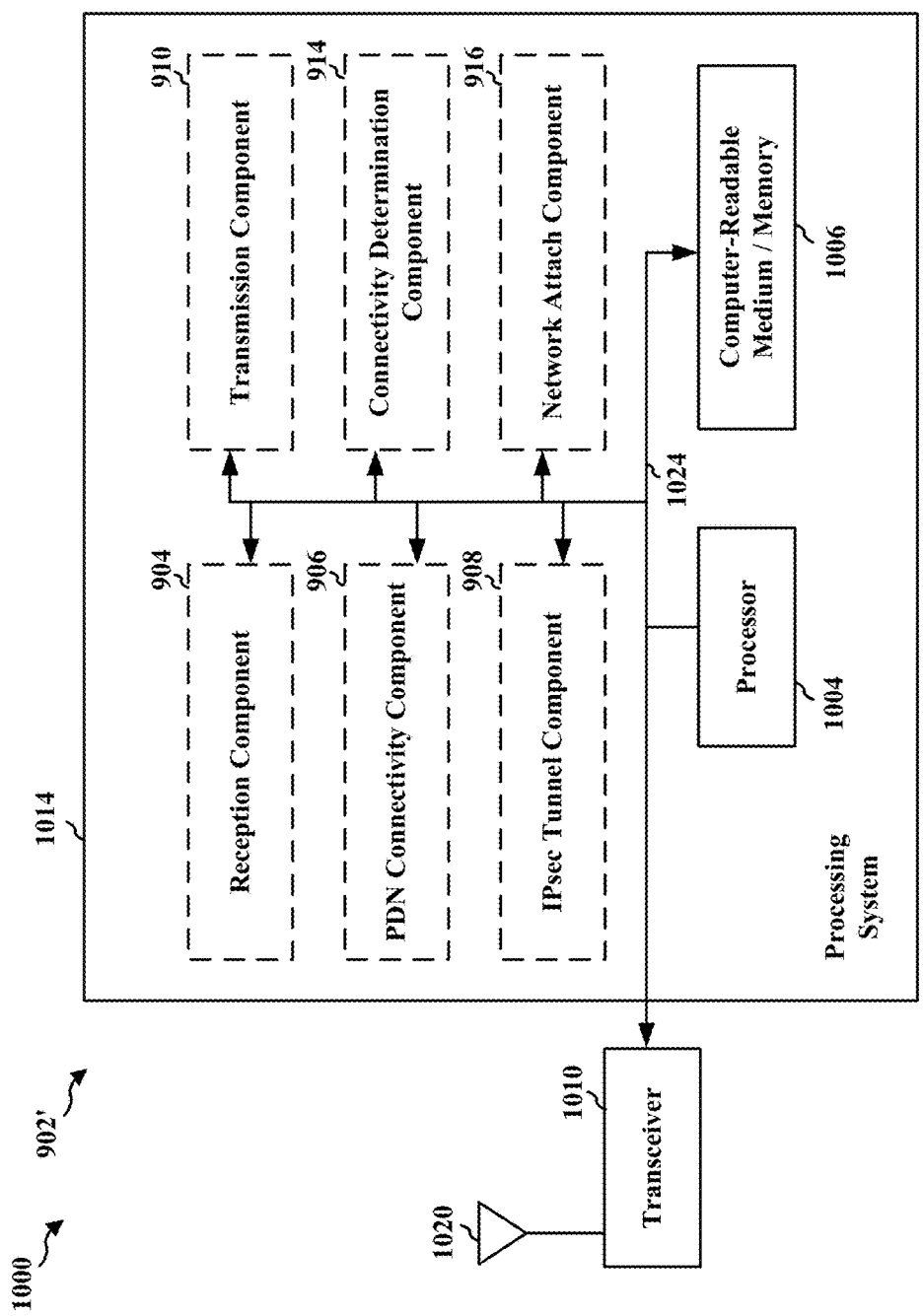
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 914, 916, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 914, 916. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for transmitting, to an NHN, an attach request. The apparatus 902/902' may further include means for receiving, from the NHN, an APN based on the attach request. The apparatus 902/902' may further include means for determining, based on the APN, whether the NHN supports home-routed traffic through a network of a MNO associated with the UE. The apparatus 902/902' may further include means for connecting to the network of the MNO based on the determination of whether the NHN supports the home-routed traffic. In an aspect, an APN is unspecified in the attach request. In an aspect, the attach request includes an IMSI associated with the UE. In an aspect, the APN indicates an MNO PLMN ID or an NHN PLMN ID.

In an aspect, the means for determining whether the NHN supports the home-routed traffic is configured to determine that the NHN supports the home-routed traffic when the APN indicates the MNO PLMN ID, and determine that the NHN does not support the home-routed traffic when the APN indicates the NHN PLMN ID. In an aspect, the means for connecting to the network of the MNO based on the determination of whether the NHN supports the home-routed traffic is configured to transmit, to the NHN, a PDN connectivity request when the NHN supports the home-routed traffic. In an aspect, the means for connecting to the network of the MNO based on the determination of whether the NHN supports the home-routed traffic is configured to establish an IPsec tunnel to an ePDG associated with the network of the MNO when the NHN does not support home-routed traffic. The apparatus 902/902' may further include means for communicating with the ePDG using an SWu interface. The apparatus 902/902' may further include means for accessing an IMS service after the connection to the network of the MNO.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a neutral home network (NHN), the method comprising:
    receiving, from a user equipment (UE), an attach request;
    determining whether home-routed traffic is supported based on a mobile network operator (MNO);
    determining an access point name (APN) for the UE based on whether the home-routed traffic is supported between a network of the MNO and the UE and based on the received attach request; and
    transmitting the determined APN to the UE.

2. The method of claim 1, wherein an APN is unspecified in the attach request.

3. The method of claim 1, wherein the APN indicates an MNO public land mobile network (PLMN) identifier (ID) or an NHN PLMN ID.

4. The method of claim 1, wherein the determination of the APN based on whether the home-routed traffic is supported between the network of the MNO and the UE and based on the received attach request further comprises identifying the MNO associated with the UE based on the attach request.

5. The method of claim 4, wherein the attach request includes an international mobile subscriber identity (IMSI) associated with the UE, and wherein the identification of the MNO associated with the UE is based on the IMSI.

6. The method of claim 1, further comprising:
    routing traffic from the UE to a packet gateway (PGW) associated with the network of the MNO using an S2a interface based on whether home-routed traffic is supported.

7. The method of claim 1, further comprising:
    providing, to the UE, Internet access when the home-routed traffic is unsupported.

8. The method of claim 1, wherein the determining the APN is further based on home-routed traffic support by the MNO.

9. A method of wireless communication for a user equipment (UE), the method comprising:
    transmitting, to a neutral home network (NHN), an attach request;
    receiving, from the NHN, an access point name (APN) based on the attach request;
    determining, based on the APN, whether the NHN supports home-routed traffic through a network of a mobile network operator (MNO) associated with the UE, wherein the home-routed traffic is supported by the NHN when the APN indicates an MNO public land mobile network (PLMN) identifier (ID) and the home-routed traffic is unsupported by the NHN when the APN indicates an NHN PLMN ID; and connecting to the network of the MNO based on the determination of whether the NHN supports the home-routed traffic.

10. The method of claim 9, wherein an APN is unspecified in the attach request.

11. The method of claim 9, wherein the attach request includes an international mobile subscriber identity (IMSI) associated with the UE.

12. The method of claim 9, wherein the APN indicates the MNO PLMN ID or the NHN PLMN ID.

13. The method of claim 12, wherein the determination of whether the NHN supports the home-routed traffic comprises:

determining that the NHN supports the home-routed traffic when the APN indicates the MNO PLMN ID; and determining that the NHN does not support the home-routed traffic when the APN indicates the NHN PLMN ID.

14. The method of claim 9, wherein the connection to the network of the MNO based on the determination of whether the NHN supports the home-routed traffic comprises:

transmitting, to the NHN, a packet data network (PDN) connectivity request when the NHN supports the home-routed traffic.

15. The method of claim 9, wherein the connection to the network of the MNO based on the determination of whether the NHN supports the home-routed traffic comprises:

establishing an Internet protocol security (IPsec) tunnel to an evolved packet data gateway (ePDG) associated with the network of the MNO when the NHN does not support home-routed traffic.

16. The method of claim 15, further comprising:
communicating with the ePDG using an SWu interface.

17. The method of claim 9, further comprising:
accessing an Internet Protocol (IP) Multimedia Subsystem (IMS) service after the connection to the network of the MNO.

18. An apparatus for wireless communication in a neutral home network (NHN), the apparatus comprising:

means for receiving, from a user equipment (UE), an attach request;

means for determining whether home-routed traffic is supported based on a mobile network operator (MNO);

means for determining an access point name (APN) for the UE based on whether the home-routed traffic is supported between a network of the MNO and the UE and based on the received attach request; and means for transmitting the determined APN to the UE.

19. The apparatus of claim 18, wherein the APN indicates an MNO public land mobile network (PLMN) identifier (ID) or an NHN PLMN ID.

20. The apparatus of claim 18, wherein the means for determining the APN based on whether home-routed traffic is supported between the network of the MNO and the UE and based on the received attach request is configured to:

identify the MNO associated with the UE based on the attach request;

determine whether home-routed traffic is supported based on the identified MNO; and determine the APN based on the determination of whether home-routed traffic is supported.

21. The apparatus of claim 20, wherein the attach request includes an international mobile subscriber identity (IMSI) associated with the UE, and wherein the identification of the MNO associated with the UE is based on the IMSI.

22. The apparatus of claim 18, further comprising:
means for routing traffic from the UE to a packet gateway (PGW) associated with the network of the MNO using an S2a interface based on whether home-routed traffic is supported.

23. The apparatus of claim 18, further comprising:
means for providing, to the UE, Internet access when the home-routed traffic is unsupported.

24. An apparatus for wireless communication, the apparatus being a user equipment (UE) and comprising:

means for transmitting, to a neutral home network (NHN), an attach request;

means for receiving, from the NHN, an access point name (APN) based on the attach request;

means for determining, based on the APN, whether the NHN supports home-routed traffic through a network of a mobile network operator (MNO) associated with the UE, wherein the home-routed traffic is supported by the NHN when the APN indicates an MNO public land mobile network (PLMN) identifier (ID) and the home-routed traffic is unsupported by the NHN when the APN indicates an NHN PLMN ID; and means for connecting to the network of the MNO based on the determination of whether the NHN supports the home-routed traffic.

25. The apparatus of claim 24, wherein the attach request includes an international mobile subscriber identity (IMSI) associated with the UE.

26. The apparatus of claim 24, wherein the APN indicates an MNO PLMN ID or an NHN PLMN ID.

27. The apparatus of claim 26, wherein the means for determining whether the NHN supports the home-routed traffic is configured to:

determine that the NHN supports the home-routed traffic when the APN indicates the MNO PLMN ID; and determine that the NHN does not support the home-routed traffic when the APN indicates the NHN PLMN ID.

28. The apparatus of claim 24, wherein the means for connecting to the network of the MNO based on the determination of whether the NHN supports the home-routed traffic is configured to transmit, to the NHN, a packet data network (PDN) connectivity request when the NHN supports the home-routed traffic.

29. The apparatus of claim 24, wherein the means for connecting to the network of the MNO based on the determination of whether the NHN supports the home-routed traffic is configured to establish an Internet protocol security (IPsec) tunnel to an evolved packet data gateway (ePDG) associated with the network of the MNO when the NHN does not support home-routed traffic.

30. The apparatus of claim 29, further comprising:
means for communicating with the ePDG using an SWu interface.

31. The apparatus of claim 24, further comprising:
means for accessing an Internet Protocol (IP) Multimedia Subsystem (IMS) service after the connection to the network of the MNO.

* * * * *

UNITED STATES PATENT AND TRADEMARK OFFICE
CERTIFICATE OF CORRECTION

PATENT NO. : 10,172,184 B2
APPLICATION NO. : 15/633346
DATED : January 1, 2019
INVENTOR(S) : Manu Sharma et al.

It is certified that error appears in the above-identified patent and that said Letters Patent is hereby corrected as shown below:

In the Claims

Column 26, Claim 1, Line 21, replace "home" with --host--;

Column 26, Claim 9, Line 58, replace "home" with --host--;

Column 27, Claim 18, Line 42, replace "home" with --host--;

Column 28, Claim 24, Line 16, replace "home" with --host--.

Signed and Sealed this
Twenty-third Day of July, 2019

Andrei Iancu
*Director of the United States Patent and Trademark Office*